United States Patent [19]
Patton

[11] 3,896,705
[45] July 29, 1975

[54] PRESSURE FEEDBACK SYSTEM

[75] Inventor: Jon R. Patton, Jackson, Mich.

[73] Assignee: Clark Equipment Company, Buchanan, Mich.

[22] Filed: Jan. 21, 1974

[21] Appl. No.: 435,402

[52] U.S. Cl. .................. 91/413; 60/416; 60/468; 91/447; 192/87.18; 192/109 F
[51] Int. Cl. ............................................ F15b 11/22
[58] Field of Search ........ 60/416, 468; 91/413, 447, 91/240; 192/87.18, 87.19, 109 F

[56] References Cited
UNITED STATES PATENTS

| | | | |
|---|---|---|---|
| 2,706,027 | 4/1955 | Ragland | 192/109 F |
| 2,941,639 | 6/1960 | Christenson et al. | 91/413 X |
| 3,583,422 | 6/1971 | Dach et al. | 91/447 X |
| R26,513 | 12/1968 | Klaus et al. | 60/416 X |

*Primary Examiner*—Irwin C. Cohen
*Assistant Examiner*—Edward Look
*Attorney, Agent, or Firm*—Ernst H. Ruf

[57] ABSTRACT

An improvement in a system for actuating a pair of fluid-pressure operated devices including a first modulator in series with a first accumulator connected in circuit with a first one of the devices, a second modulator in series with a second accumulator connected in circuit with a second one of the devices, each of the modulators including a variable volume chamber for receiving pressurized fluid, each of the accumulators including piston means, with each accumulator being charged from the pressurized fluid in the associated one of the modulator variable volume chambers for fully displacing the piston means in a first direction wherein the improvement takes the form of additional circuit means for interconnecting the first and second modulators with the second and first accumulators respectively, thereby permitting the use of pressurized fluid for fully displacing the piston means in a second opposite direction for resetting one accumulator to its rest position while concomitantly charging the other accumulator.

6 Claims, 7 Drawing Figures

PRESSURE FEEDBACK SYSTEM

BACKGROUND OF THE INVENTION

1. Field of the Invention

The field of art to which this invention pertains includes that of fluid handling; more specifically, a pressure feedback system for operatively interconnecting first and second modulators with second and first accumulators, respectively, thereby permitting concomitant charging of one accumulator while resetting the other accumulator.

This invention is an improvement that is preferably used with a fluid pressure modulator and system of the type shown, described and claimed in copending U.S. Patent application Ser. No. 360,203 filed May 14, 1973, now U.S. Pat. No. 3,848,620 (also assigned to the assignee of this invention), although not restricted thereto.

2. Description of the Prior Art

The previously noted copending application which is incorporated herein by reference, sets forth an invention that relates to a pressure modulator and system which may be utilized to prevent too abrupt an application of hydraulic pressure to a device in order to prevent shock or damage to the device or something controlled by it. In many hydraulic systems it is necessary to have sufficient fluid pressure to maintain a hydraulic device properly engaged or in position, but it is also important to properly modulate the pressure buildup. The improvement of this invention may be added, for example, to a fluid pressure system for operating fluid pressure actuated clutches in a power shift transmission, but it will be appreciated that it is also useful in other applications.

The system in which the improvement of this invention may be utilized preferably includes a pair of fluid pressure operated devices, such as clutches, including connections to both a source of fluid under pressure and to tank. A control valve permits the selective admission of pressurized fluid from the source into one of the devices and the admission of fluid from the other devices to tank. The first modulator and a first accumulator are interconnected in circuit with the first one of the devices while a second modulator and a second accumulator are interconnected in circuit with the second one of the devices, with each of the modulators including a variable volume chamber for receiving the pressurized fluid. Each of the accumulators includes piston means and the accumulators are charged from the pressurized fluid in the associated ones of the modulator variable volume chambers for fully displacing the piston means in a first direction and gradually increasing the pressure for actuating the respective device.

During normal operating conditions of these prior art structures, i.e., when one of the clutches is fully applied, the associated accumulator piston is at its maximum displacement in the one direction while the piston member of the inactive accumulator is in its rest or minimum displacement position.

When the position of the control valve is reversed, the previously-charged accumulator is connected to tank and its associated piston gradually returns to its rest position as fluid is vented from the accumulator through the modulator and the control valve to tank. Thus, in order to reset the previously active accumulator, the piston must travel from its maximum displacement position to its rest position, after the control valve has been reversed, in order for modulation to work. The movement of the piston to its reset position is generally aided by one or more springs that were previously compressed during the charging cycle of the accumulator; these spring forces often being marginal in systems having low cracking pressures. Therefore, in prior art structures of the type described, it has been known to take considerable time to return the accumulator piston from its fully displaced position to its rest position thus causing undesirably long lag times when shifting back and forth between the various clutches since the previously disengaged clutch cannot be re-engaged until its accumulator has been reset to rest position.

SUMMARY OF THE INVENTION

This invention solves the previously-mentioned problem by providing a pressure feedback system wherein the inactive accumulator piston is reset, by means of pressurized fluid.

In one preferred mode of carrying out this invention, circuit means are added for interconnecting the first modulator with the second accumulator and further circuit means are added for interconnecting the second modulator with the first accumulator, thereby using pressurized fluid for fully displacing the piston in the inactive accumulator to rest position, thereby resetting the accumulator while concomitantly charging the accumulator of the device being engaged. Depending upon the desired pressure-time relationship of the accumulator, the need for the prior art springs, that aid in the return of the accumulator piston to rest position, is eliminated. The use of pressurized fluid for resetting the accumulator pistons to rest position, not only provides for a positive resetting of the accumulator but also substantially decreases the resetting cycle time.

DESCRIPTION OF THE PREFERRED EMBODIMENT

Figure 1:
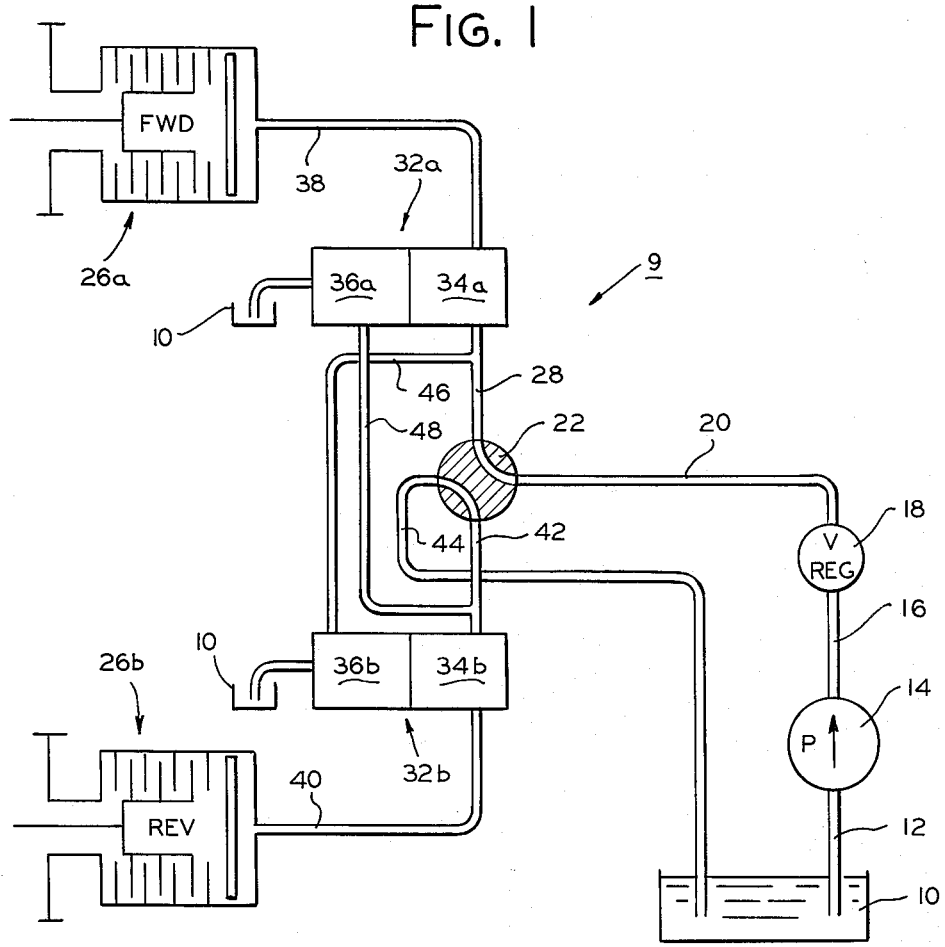
FIG. 1 shows a schematic diagram of a typical hydraulic system having two fluid pressure modulators and two accumulators employing the pressure feedback system of this invention.

Referring now to the drawings, FIG. 1 is a diagrammatic illustration of a hydraulic system employing first and second modulators interconnected with first and second accumulators, respectively, which may be used in the actuation of first and second fluid pressure operated devices, such as forward and reverse clutches, respectively, of a power shift transmission such as is disclosed and claimed in U.S. Pat. No. 3,465,609 (also assigned to the assignee of the present invention). In utilizing such clutches, it is desirable to employ a pressure which may, for example range from 240 to 280 P.S.I., in order to maintain the clutches firmly in engagement during all operating conditions to which the transmission may be subjected. At the same time, however, it is desirable not to engage these clutches too abruptly but to engage them by a gradual pressure build-up in order to minimize the shock on the gears and other component parts of the transmission.

In FIG. 1, the numeral 9 generally indicates the entire hydraulic system, whereas numeral 10 generally indicates a hydraulic reservoir or sump from which fluid is drawn through a conduit 16 from which the pressurized fluid goes through a pressure regulator 18 and thereafter through conduit 20 through a selector valve 22 of any well known construction. Valve 22, which for ease of illustration and understanding, is shown as a rotary valve (while preferably being a fourway, three-position, spool valve), depending upon its position, directs pressurized fluid either to the first or forward clutch indicated at 26a, or the second or reverse clutch indicated at 26b. For example, when valve 22 is in the position illustrated in FIG. 1, clutch 26a is pressurized and actuated while fluid is discharged from clutch 26b. When valve 22 is moved to the position indicated in FIG. 1, pressurized fluid flows through conduit 28, through combined first pressure modulator and accumulator 32a and conduit 38 into forward clutch 26a. It should be understood that it is not essential that all of the fluid flow through combined first pressure modulator and accumulator 32a since it could be located in a branch circuit connected to conduits 28 and 38. It should also be understood that in lieu of combined first pressure modulator and accumulator 32a, which is made up of modulator 34a and accumulator 36a contained within a single housing, individual and separate modulators and accumulators could also be utilized. When valve 22 is first turned to the position indicated in FIG. 1, fluid is discharged from clutch 26b through conduit 40, modulator portion 34b of a combined second modulator and accumulator 32b, conduit 42, valve 22 and return conduit 44 back to reservoir 10. It will be readily understood that when valve 22 is turned to its other operative position, clutch 26b will be pressurized and clutch 26a is drained back to the reservoir.

FIG. 1 also shows that a conduit 46 connects conduit 28 with a second accumulator 36b, thus, in effect, interconnecting first modulator 34a and second accumulator 36b. In the same manner, conduit 48 interconnects conduit 42 with first accumulator 36a, thus, in effect, interconnecting second pressure modulator 34b and first accumulator 36a. The exact details and functionings of the interconnections between the first and second modulators with the second and first accumulators, respectively, will be explained in more detail hereinafter.

The following detailed description deals only with combined first pressure modulator and accumulator 32a and a system in which it is embodied although it will be appreciated that combined second pressure modulator and accumulator 32b is identical thereto. Thus, in the following description, the suffix a will be applied to the component parts of combined first pressure modulator and accumulator 32a while the suffix b will be applied to like parts in combined second pressure modulator and accumulator 32b. No invention is claimed for either the modulator or accumulator structure, per se.

Figure 2:
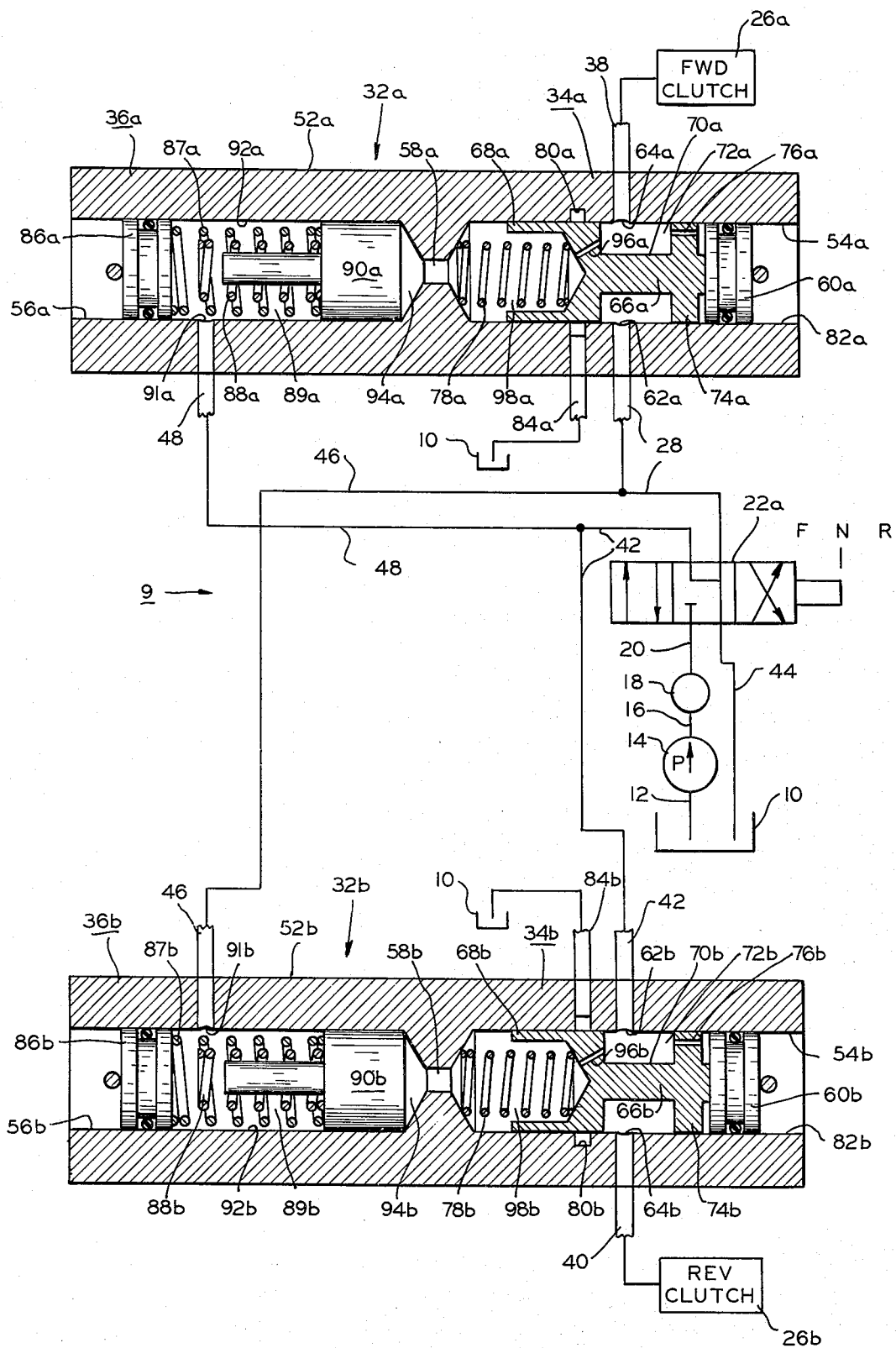
FIG. 2 is a partially schematic sectional view showing the interiors of the two modulators and two accumulators together with their control valve in the neutral condition.

FIG. 2 is a partially schematic sectional view showing the interiors of both combined first pressure modulator and accumulator 32a, and combined second pressure accumulator and modulator 32b together with their previously described connecting circuitry as well as a four-way control valve 22a, the latter being in its neutral position. Combined first pressure accumulator and modulator 32a is comprised of first modulator 34a and first accumulator 36a, both of which are contained within a single elongated housing 52a having an opening 54a therein in the form of a bore extending in from one end of the housing, and another bore 56a extending in from the other end, with the two bores being joined by a passageway 58a of reduced diameter. A fixed closure member 60a is provided to close the bore 54a near its right end. Conduit 28 is connected with bore 54a through port 62a and conduit 38 is similarly connected with bore 54a through a port 64a.

To the left of closure member 60a and abutting the closure member in the quiescent or inactive, i.e., neutral condition of modulator 34a, is a spool 66a having a land portion 68a projecting to the left and a reduced diameter center portion 70a which forms a chamber 72a between land portion 68a and closure member 60a. There is also a land portion 74a near the right end of spool 66a which is provided with a passage 76a. If desired, passage 76a may be large enough to provide for essentially unrestricted flow of hydraulic fluid back and forth between the two sides of land portion 74a so that in effect a single variable volume chamber 72a is formed between closure member 60a and land portion 68a on the spool. In order to hold spool 66a to the right against closure member 60a in the quiescent position and to resist movement of spool 66a to the left, a compression coil spring 78 a is provided, with spring 78a also having other purposes as will be described hereinafter. If desired, passage 76a may be of the restricted type so that when pressurized fluid is admitted to chamber 72a there is a delay in the movement of spool 66a to the left because the pressurized fluid requires more time to pass through such a passage and get to the right end of spool 66a in order to move it to the left.

There is a vent, in the form of an annular groove 80a, in the inner surface of housing 52a and this groove is connected to a vent line 84a which directs fluid, which enters the groove 80a, back to reservoir 10.

A second closure member 86a is provided to close bore 56a near its left end. One or more compression springs 87a, 88a may be located in a chamber 89a between closure member 86a and a movable piston 90a which is movable with respect to the inner wall or surface 92a of bore 56a suitably sealed to act as an accumulator which is generally indicated by numeral 36a. Conduit 48 is connected with chamber 89a through a port 91a. In the operation of accumulator 36a, as pressurized fluid enters the chamber indicated at 94a, it forces piston 90a to the left and compresses springs 87a and 88a as the volume of chamber 94a increases. It will, of course, be appreciated that other equivalent types of accumulators can also be utilized, the essential requirement being a device which receives pressurized fluid and retains such fluid at increasing pressure until the maximum volume is reached.

The build up of pressure in chamber 94a is gradual and occurs as a result of fluid flow from chamber 72a through a restricted opening 96a in a spool 66a, and thence through another chamber 98a and passageway 58a and on into chamber 94a in accumulator 36a. It will be appreciated that the rate of flow into the accumulator is determined by the size of opening 96a, and that the rate of pressure increase is determined by the characteristics of springs 87a and 88a. Depending on the desired pressure-time relationship, it is entirely possible that one or both of springs 87a and 88a in chamber 89a may be deleted from accumulator 36a.

As previously noted, the component parts of combined second pressure modulator and accumulator 32b are identical to those of first presure modulator and accumulator 32a. It should be noted, however, in combined second pressure modulator and accumulator 32b that it is conduit 42 (rather than conduit 28 as in modulator 34a) that is connected with bore 54b through port 62b, and that it is conduit 40 (rather than conduit 38 in accumulator 34a) that is connected with bore 54b through port 64b. In addition, in accumulator 36b, it is conduit 46 (rather than conduit 48 in accumulator 36a) that is connected with chamber 89b through port 91b.

Figure 3:
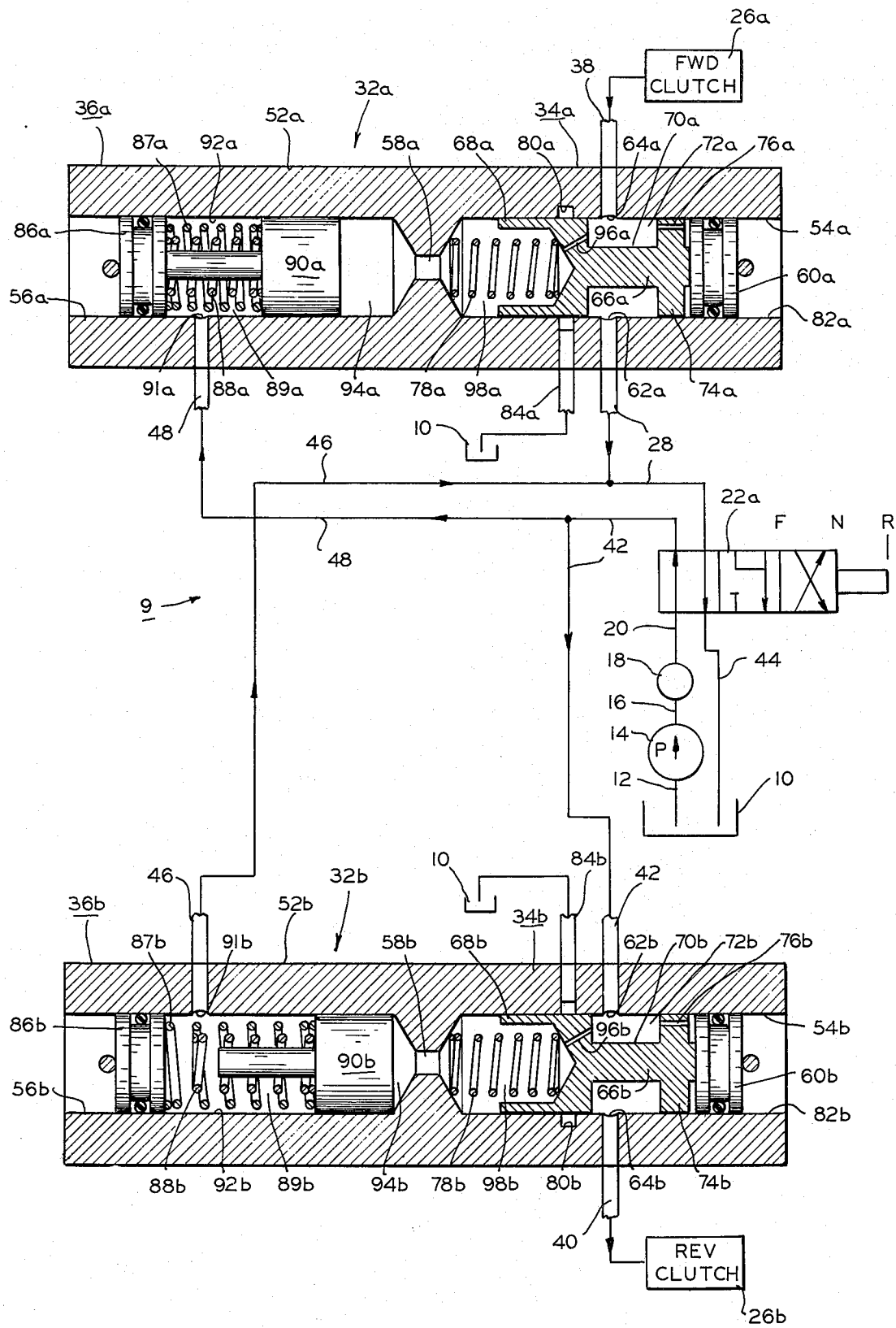
FIG. 3 shows the modulators, accumulators and control valve of FIG. 2 immediately after the shift from forward to reverse position.

The operational sequence of system 9 is shown in FIGS. 3 to 6, with FIG. 3 showing the position of the several modulators, and accumulators as well as control valve 22a, at the instance immediately after the shift from forward to reverse position. Prior to describing the exact operational cycle involved, it should be noted, that during normal operating conditions, i.e., when one of the clutches is fully applied, the spool 66 of the associated modulator is fully retracted (spool 66 abuts closure member 60) and the associated accumulator piston 90 is at its maximum displacement to the left (piston 90 abuts closure member 86). In addition, the spool member of the modulator associated with the inactive clutch is fully retracted and the piston member of the inactive accumulator is at its minimum stroke, i.e., fully retracted to the right.

Figure 4:
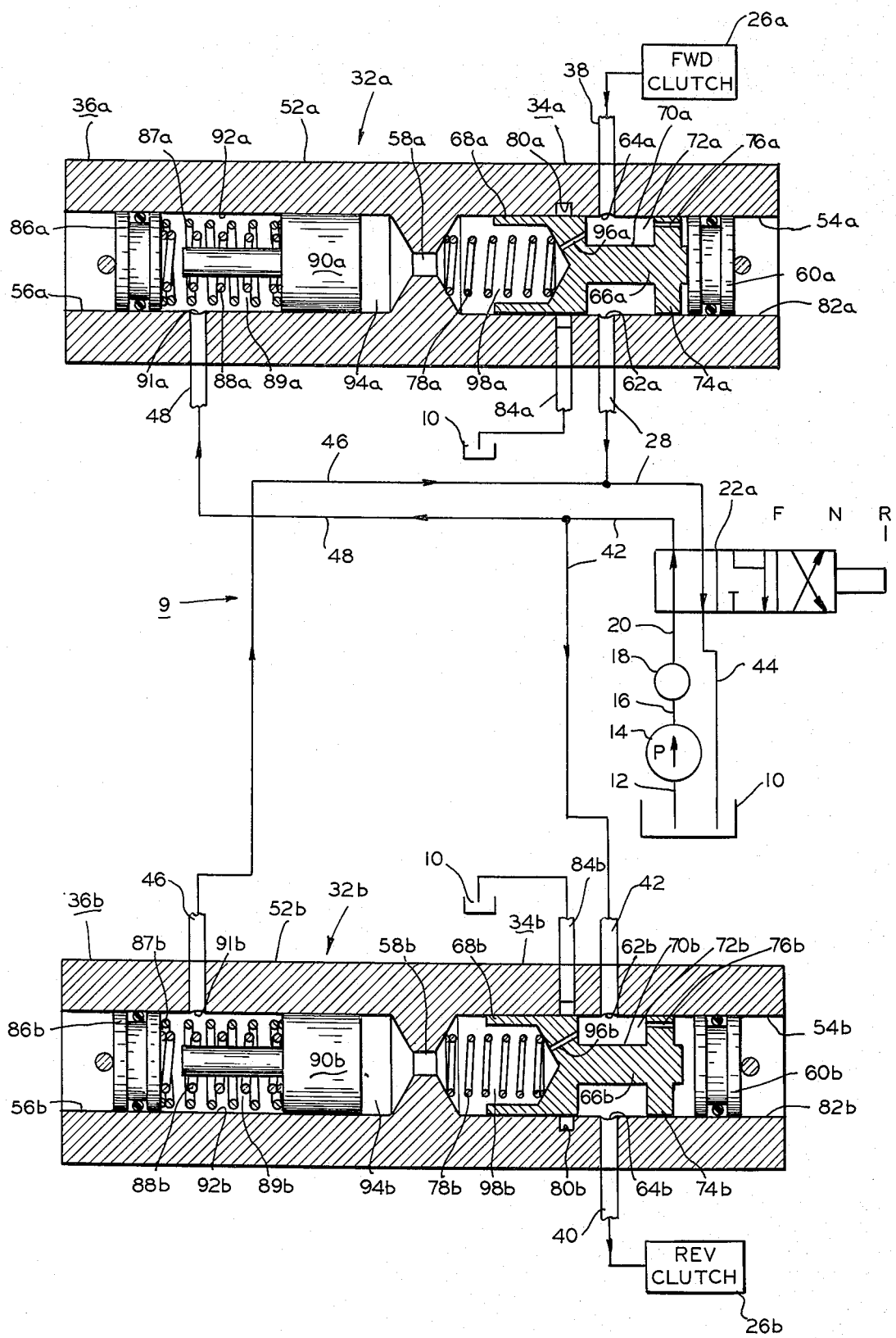
FIG. 4 shows the system of FIG. 3 in one transitory or operating condition.
Figure 5:
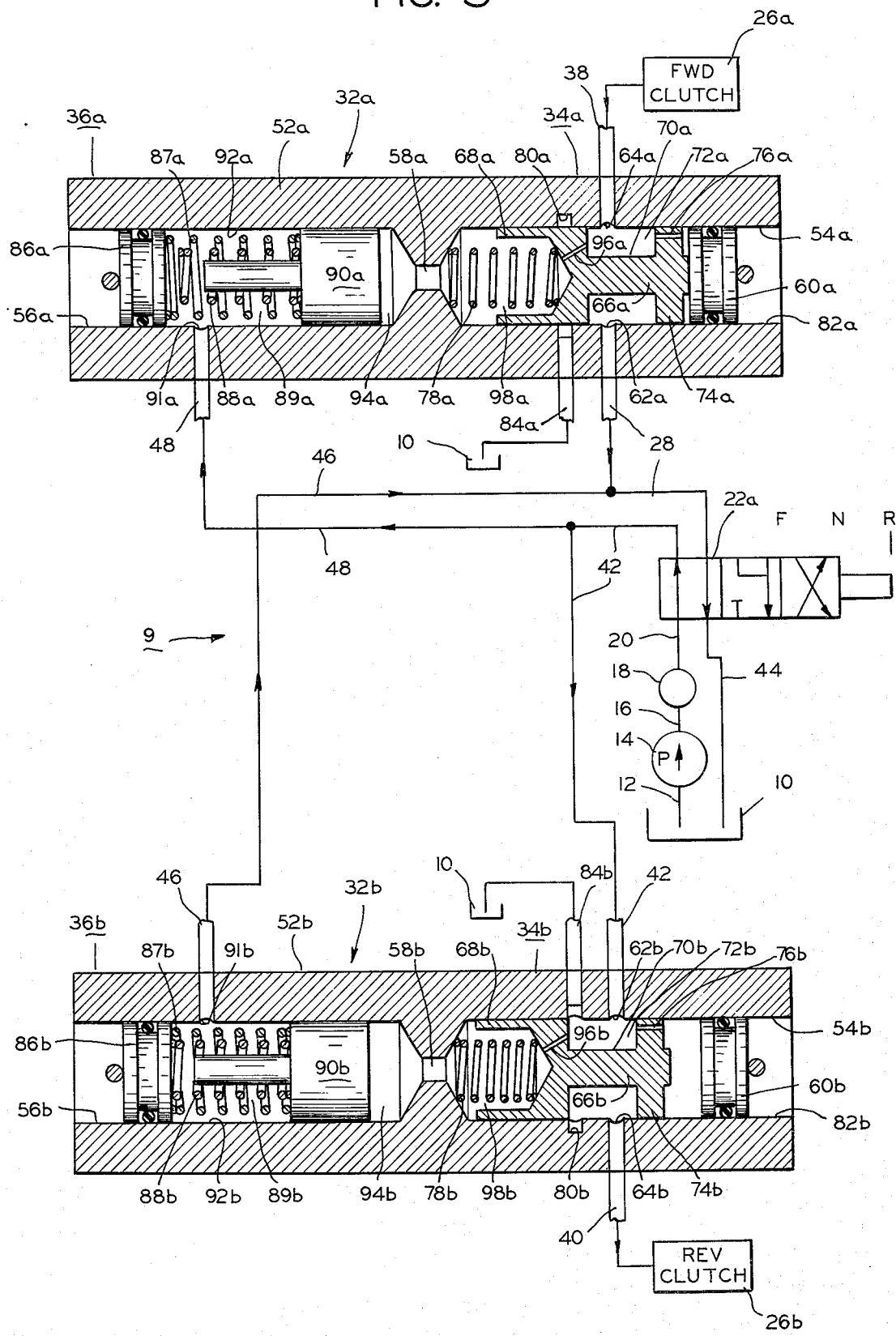
FIG. 5 shows the system of FIG. 3 in another transitory or operating condition.

Although FIG. 3 shows forward clutch 26a and its associated combined first pressure modulator and accumulator 32a in the fully applied position, and clutch 26b with its associated combined second modulator and accumulator 32b in the inactive position, control valve 22a has just been shifted to the reverse position. Therefore, pressurized hydraulic fluid, the pressure of which is normally maintained at line pressure by regulator 18, is admitted through conduit 42 concomitantly into variable volume chamber 72b and through conduit 48 into chamber 89a. Looking first at combined second modulator and accumulator 32b, this pressurized fluid causes spool 66b to move to the left, thereby compressing spring 78b. FIG. 4 shows spool 66b in a transitory position, after some initial movement, in which the land portion 68b is just about to uncover vent opening 80b. As the movement of spool 66b continues to the left, the position indicated in FIG. 5 is reached in which fluid is discharged through vent 80b and line 84b.

The spring 78b is such that in the typical modulator being described, it provides sufficient force resisting the movement of spool 66b to the left, or in other words, urging spool 66b to the right, so that it produces a pressure drop or differential between inlet port 62b and vent 80b. Such a pressure differential is necessary for the operation of accumulator 36b and the force of spring 78b also is essential for another purpose which is described hereinafter.

When pressurized fluid is admitted into chamber 72b, a portion of such fluid flows through restricted opening 96b and through chamber 98b into chamber 94b, because of the mentioned pressure differential, thereby moving piston 90b of the accumulator to the left and compressing springs 87b, 88b. As this action occurs, the pressure gradually increases in accumulator 36b and in chamber 98b. The force on spool 66b, that results from this pressure, plus the force of spring 78b, move spool 66b back to the right, thereby causing a pressure build-up in chamber 72b, and in conduit 40, as well as in clutch 26b (which is supplied by conduit 40).

Figure 6:
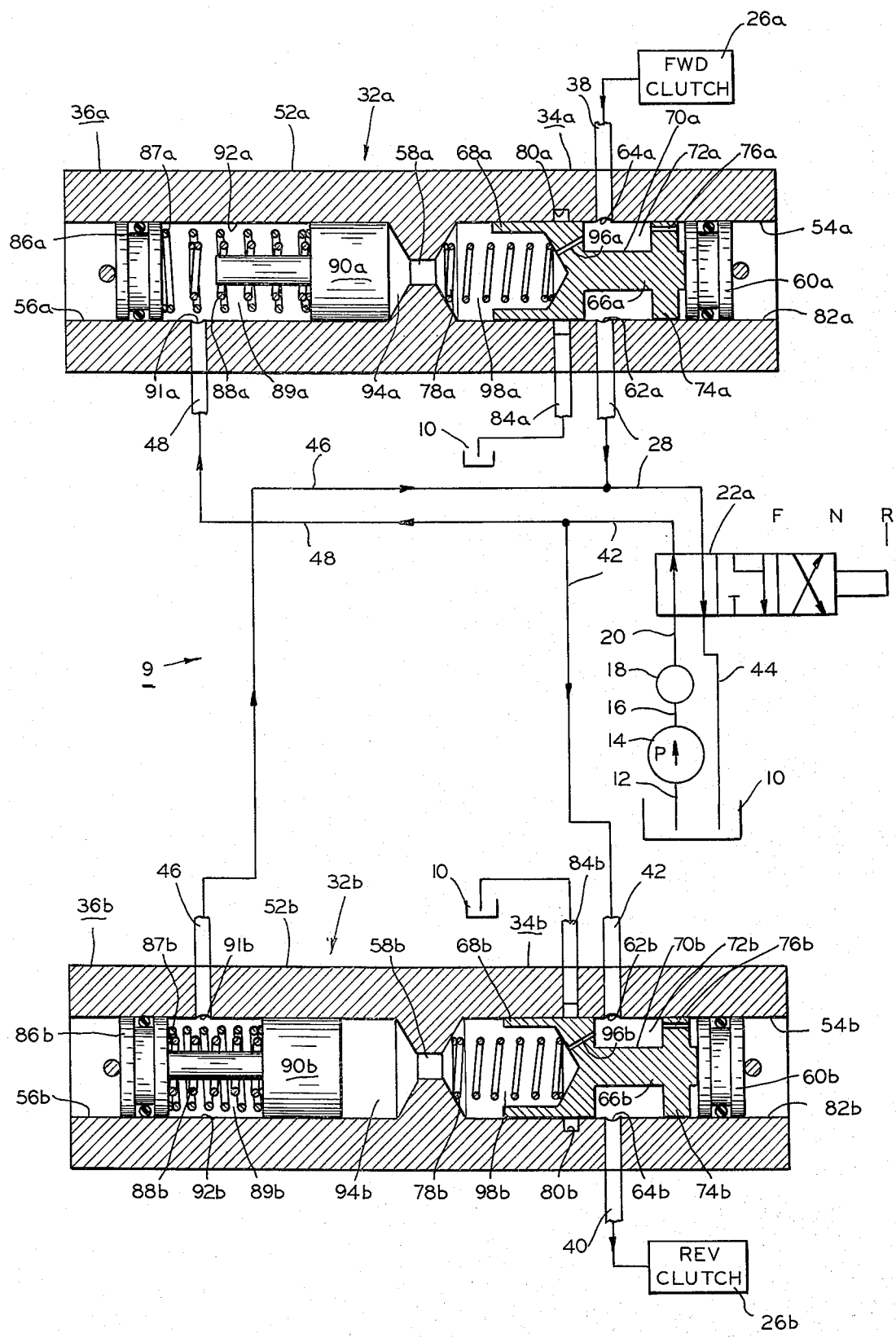
FIG. 6 shows the system of FIG. 3 once the reverse clutch has been fully applied, i.e., in its normal operating position.

FIG. 6 shows that the projection on the back of piston 90b of accumulator 36b has bottomed against stop member 86b, meaning that accumulator 36b has reached its maximum volume or displacement. It will be seen by referring to FIGS. 3, 4, 5 and 6 in sequence, that accumulator piston 90b has gradually moved from right to the left during the sequence of operations described. FIG. 6 also shows the condition in which modulator spool 66b has moved completely back to the right, i.e., to its initial position, while accumulator 36b remains in its fully displaced position. This is the normal operating condition for the clutch or other device to which combined modulator and accumulator 32b is connected, and FIG. 7, to be described, illustrates the relation of pressure and time to the positions of various parts of the modulator during the just described modulating operation.

Figure 7:
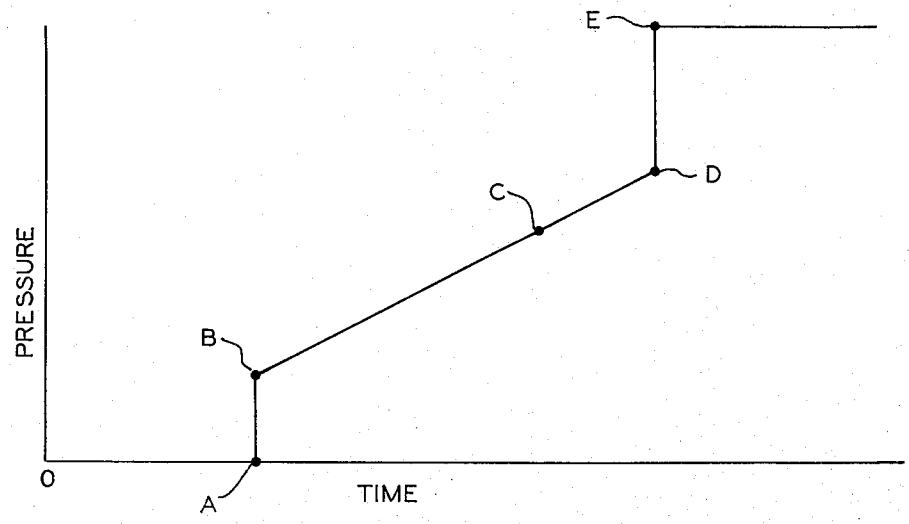
FIG. 7 is a graph showing a typical pressure-time relationship for the system of FIGS. 3 through 6, inclusive.

Referring now to FIG. 7, the pressure is plotted along the ordinate and time along the abscissa, and the resulting graph illustrates a typical pressure-time relationship for the embodiment of the combined modulator and accumulator heretofore described. It should be noted that FIG. 7 is specific to a combined modulator and accumulator having but one compression spring 87 and having an essentially unrestricted passage 76 in spool 66. Starting at zero in FIG. 7, when valve 22a is operated to admit pressurized fluid through conduit 42 into modulator 34b and on through conduit 40 into clutch 26b, the pressure for the first increment of time is negligible and the fluid flows through modulator 34b and on into clutch 26b for this time interval which continues to the point indicated at A. At this point, the system is sufficiently filled so that the pressure rises in chamber 72b an amount sufficient to overcome the force of spring 78b and move spool 66b to the left to open vent line 84b and bleed off a portion of the pressurized fluid entering through valve 22a. Point B on the graph illustrates the time and pressure at which the opening of vent line 84b occurs. Then, the accumulator fills and the system pressure increases along the line BD. Point C illustrates a typical full engagement point for a fluid pressureoperated clutch, and as the pressure passes this point, the clutch 26b becomes fully engaged, however, the pressure continues to increase to D, at which time the spool 66b is between the positions illustrated in FIGS. 5 and 6, namely, in a position at which it cuts off the vent line 84b. As far as spool 66b is concerned, the position of the spool at this point D is the same as illustrated in FIG. 3, although it will be appreciated that other conditions in the system are not the same.

When vent line 84b is cut off at point D by the return motion of spool 66b, the pressure immediately rises quickly to point E which is the full line pressure as maintained by regulator 18. It will be appreciated that this pressure provides an extra margin equal to the difference in pressures between points C and E to hold the clutch firmly in engagement in spite of shock loads and other operating conditions.

It will, of course, be appreciated that it is possible to readily change the slope of line BD merely by utilizing a different spring 87b for the accumulator. Thus, since line BD is a straight line it is easy to adjust the system to provide for desired changes in either the pressure or time of full engagement of the clutch, or both. It will also be appreciated, that the use of two springs 87b and 88b will change the straight line characteristic of line BD.

It should, of course, also be understood that in the sequence shown in FIGS. 3 through 6, with reference to combined second pressure modulator and accumulator 32b, that in order to permit movement of piston 90b from right to left, some of the fluid within chamber 89b is being vented through port 91b and conduits 46 and 28, (via valve 22a and conduit 44) to tank 10.

It should be remembered that concomitantly with the previous description of FIGS. 3 to 6 in regard to combined second pressure modulator and accumulator 32b, as previously noted, that pressurized fluid is also being admitted through conduit 48 and port 91a into chamber 89a. As shown in FIG. 3, at the time of shifting valve 22a from the forward to reverse position, the projection on the back of piston 90a has bottomed against stop member 86a, meaning that accumulator 36a is at its maximum volume. The shifting of spool 22a into its reverse position connects chamber 72a through port 62a and conduit 28, valve 22 and conduit 44, to tank or reservoir 10. As piston 90a is being advanced to the right, as is progressively shown in FIGS. 4, 5 and 6, fluid is being discharged from cavity 94a through passageway 58a into cavity 98a and from thence through opening 96a into cavity 72a. In the position shown in FIG. 6 piston 90a of accumulator 36a is fully retracted to the right and is ready for the next cycle.

It should be understood at this time that each time a shift is made in the direction of selector valve 22a (such as from reverse to forward and vice versa), that the accumulator of the inactivated clutch must be reset, i.e., piston 90 must travel from left to right after a shift in order for modulation to work when selector valve 22a is returned to the respective position. In the prior art, the retraction force for piston 90 was provided by one or more of the springs 87 and 88. However, it should be noted that the fluid from cavity 94 must pass through a relatively small opening in 96 in spool 66. Therefore, considerable time is required for piston 90 to be fully returned to its rightmost position. This time factor is even further increased in hydraulic systems having low cracking pressures, since the sum of the installed forces in springs 87 and 88 must be decreased accordingly, with marginal spring forces resulting thereby. In actual trials, it was found that it took up to 10 seconds for piston 90 to be returned from its fully extended (left) position to its rest (right) position. Such a delay is totally unacceptable.

This invention solves the above-noted problem by interconnecting first modulator 34a with second accumulator 36b and interconnecting second modulator 34b with first accumulator 36a. This interconnection permits the full pump pressure to concomitantly charge the accumulator associated with the clutch being applied while resetting the accumulator of the clutch that is connected to tank. By using pressurized fluid to reset the accumulator of the clutch that is connected to tank, any force requirement in springs 87 and 88 is eliminated. As a matter of fact, springs 87 and 88 may be dispensed with in respect to the resetting of the accumulator. Thus, this invention utilizes full pump pressure to not only charge one accumulator but concomitantly to reset the opposite accumulator, thereby substantially reducing the cycle time between directional shifts.

It should of course be obvious that a shift from reverse to forward direction is identical in action and that the illustrative flow conditions shown in FIGS. 3 to 6 are merely reversed. It will be appreciated that during the engagement of clutch 26b the accumulator spring 87b (or springs 87b and 88b) remains fully compressed thereby reflecting the line pressure which is present in chamber 72b and in accumulator 36b. When clutch 26b is disengaged, fluid is discharged from it in whole or in part. Similarly, at least enough fluid is discharged from accumulator 36b so that piston 90b is restored to the condition of FIG. 3 and spring 78b holds spool 66b to the right in readiness for another operating cycle as described.

From the foregoing, it is believed that those familiar with the art will readily recognize and appreciate the novel concepts and features of the present invention. Obviously, while the invention has been described in relation to only one preferred embodiment, numerous variations, changes and substitutions of equivalents will present themselves to persons skilled in the art and that these may be made without necessarily departing from the scope and principles of this invention. As a result, the embodiment described herein is subject to various modifications, changes and the like, with the scope of this invention being determined solely by reference to the claims appended hereto.

What is claimed is:

1. In combination with a pair of fluid-pressure-operated devices, a system for actuating said pair of fluid pressure operated devices including fluid-conducting circuit means connecting both of said devices to both a source of fluid under pressure and to tank, a selector valve connected in said circuit means to include the selective admission of pressurized fluid from the source, via said circuit means, into one of said devices and the admission of fluid from the other of said devices, via said circuit means, to tank, a first modulator in said circuit means controlling fluid to said one device, a first accumulator including pressure responsive means dividing said accumulator into two expansible chambers, means connecting said first modulator in series with said first accumulator and providing fluid communication between one of said expansible chambers of said first accumulator and said first modulator, a second modulator in said circuit means controlling fluid to the other of said devices, a second accumulator including pressure responsive means dividing said second accumulator into two expansible chambers, means connecting said second modulator in series with said second accumulator and providing fluid communication between one of said expansible chambers of said second accumulator and said second modulator, each of said modulators including means for bleeding off a portion of the pressurized fluid passing through the said modulator during actuation of its respective device, with each of one of said expansible chambers of said accumulators being charged by said portion of the pressurized fluid and gradually increasing the pressure for actuating its respective device, each of said accumulators also alternately being resettable to a rest position by said pressurized fluid, wherein the improvement comprises the addition of further fluid-conducting circuit means for directly connecting the circuit means passing fluid through said first and second modulators with the other of said expansible chambers of said second and first accumulators, respectively, so as to permit concomitant charging of the accumulator associated with one of said devices while resetting the accumulator associated with the opposite one of said devices to rest position by means of said pressurized fluid.

2. In combination with a pair of fluid-pressure-operated devices, a system for actuating said pair of fluid pressure operated devices including fluid-conducting circuit means connecting both of said devices to both a source of fluid under pressure and to tank, a selector valve connected in said circuit means to include the selective admission of pressurized fluid from the source into one of said devices and the admission of fluid from the other of said devices to tank, a first modulator in said circuit means controlling fluid to said one device, a first accumulator including pressure responsive means dividing said accumulator into two expansible chambers, means connecting said first modulator in series with said first accumulator and providing fluid communication between one of said expansible chambers of said first accumulator and said first modulator, a second modulator in said circuit means controlling fluid to the other of said devices, a second accumulator including pressure responsive means dividing said second accumulator into two expansible chambers, means connecting said second modulator in series with said second accumulator and providing fluid communication between one of said chambers of said second accumulator and said second modulator, each of said modulators including a variable volume chamber for receiving said pressurized fluid, each of said pressure responsive means of said accumulators including piston means, with said accumulators being charged in said one of the expansible chambers thereof from said pressurized fluid in the respective ones of said modulator variable volume chambers thereby fully displacing said piston means in a first direction and gradually increasing the pressure for actuating their respective devices, wherein the improvement comprises:
   a. a first fluid-conducting connection of said first modulator with the other of said expansible chambers of said second accumulator; and
   b. a second fluid-conducting connection of said second modulator with the other of said expansible chambers of said first accumulator, said first and second connections being made in a manner to permit said pressurized fluid to fully displace said piston means in the accumulator associated with the opposite one of said devices in a second direction, opposite to said first direction, thereby resetting to a rest position the accumulator associated with the opposite one of said devices concomitantly to charging the accumulator associated with the respective one of said devices and vise versa.

3. In combination with a pair of fluid-pressure-operated devices, a system for actuating said pair of fluid pressure operated devices including fluid-conducting circuit means connected to both of said devices and having connections to both a source of fluid under pressure and to tank, a selector valve connected in said circuit means to include selective admission of pressurized fluid from the source into one of said devices, and the admission of fluid from the other of said devices to tank, a first modulator in said circuit means controlling fluid to said one device, a first accumulator including pressure responsive means dividing said accumulator into two expansible chambers, means connecting said first modulator in series with said first accumulator and providing fluid communication between one of said expansible chambers of said first accumulator and said first modulator, a second modulator in said circuit means controlling fluid to the other of said devices, a second accumulator including pressure responsive means dividing said second accumulator into two expansible chambers, means connecting said second modulator in series with said second accumulator and providing fluid communication between one of said expansible chambers of said second accumulator and said second modulator, each of said modulators including means for bleeding off a portion of the pressurized fluid passing through the said modulator during actuation of its respective device, each of said modulators further including a variable volume chamber for receiving said pressurized fluid, each of said accumulators being alternately chargeable to a charged position and resettable to a rest position by oppositely axially displacing the pressure responsive means thereof, via said pressurized fluid, with each of said accumulators being charged in said one of the expansible chambers thereof from said pressurized fluid in the associated one of said modulator variable volume chambers, and gradually increasing the pressure for actuating its respective device, wherein the improvement comprises the addition of fluid-conducting pressure feedback means connecting said first and second modulators with the other of said expansible chambers of said second and first accumulators, respectively, to permit concomitant resetting, by means of said pressurized fluid, of the accumulator of the said device connected to tank.

4. The improved system of claim 1 wherein said further circuit means includes
   a. a first pressure feedback conduit directly connecting said first modulator with the other of said expansible chambers of said second accumulator; and
   b. a second pressure feedback conduit directly connecting said second modulator with the other of said expansible chambers of said first accumulator.

5. The improved system of claim 4 wherein each of said first and second modulators further includes a variable volume chamber for receiving said pressurized fluid, with said first modulator variable volume chamber being in fluid communication with said first pressure feedback conduit and said second modulator variable volume chamber being in fluid communication with said second pressure feedback conduit.

6. The improved system of claim 5 wherein the pressure responsive means of each of said first and second accumulators includes piston means, with said accumulators being alternately charged from pressurized fluid in the respective ones of the said modulator variable volume chambers thereby fully displacing said piston means in a first direction and gradually increasing the pressure for actuation of their respective devices, said first and second pressure feedback conduits being connected to said second and first accumulators respectively, so as to permit displacement of the piston means in the accumulator associated with the device opposite to said device being actuated in a second direction and opposite to said first direction of the piston in the accumulator associated with the device being actuated, thereby resetting the accumulator associated with the device opposite to the device being actuated while concomitantly charging the accumulator associated with the device being actuated.

* * * * *